United States Patent
Hodkinson

[11] 3,848,935
[45] Nov. 19, 1974

[54] FLUID PRESSURE BRAKING SYSTEMS FOR VEHICLES

[75] Inventor: Harold Hodkinson, Leamington Spa, England

[73] Assignee: Automotive Products Limited, Leamington Spa, England

[22] Filed: Apr. 16, 1973

[21] Appl. No.: 351,314

[30] Foreign Application Priority Data
Apr. 19, 1972  Great Britain.................. 18165/72

[52] U.S. Cl............................................. 303/22 R
[51] Int. Cl................................................ B60t 8/26
[58] Field of Search........................ 303/22 R, 22 A

[56] References Cited
UNITED STATES PATENTS
| | | | |
|---|---|---|---|
| 3,149,886 | 9/1964 | Dorner............................ | 303/22 A |
| 3,479,095 | 11/1969 | Lewis et al...................... | 303/22 R |
| 3,649,084 | 4/1972 | Stelzer............................ | 303/22 R |

Primary Examiner—Trygve M. Blix
Assistant Examiner—Stuart M. Goldstein

[57] ABSTRACT

A pressure reducing valve for regulating liquid pressure supplied to apply the rear brakes of a motor vehicle. The valve body has a stepped bore which is closed by a plug at its largest diameter end. A plunger slides in the smallest diameter bore portion and projects through the open end thereof to engage a spring which acts to hold the plunger against the plug. The loading of the spring varies with the loading of the vehicle so that it increases with an increase in the loading of the vehicle. The plunger has an annular flange which seats upon the shoulder between the smallest and intermediate diameter bore portions, when the plunger is deflected against the loading of the spring, in order to close a passage for the flow of liquid from the liquid pressure inlet to the liquid pressure outlet via passages in the plunger. A stepped plunger, which slides on that portion of the main plunger between the annular flange and the plug, has its smaller diameter portion engaged slidably in the intermediate diameter bore portion so as to be exposed to inlet pressure, and its larger diameter portion engaged slidably in the larger diameter bore portion so as to be exposed to outlet pressure. Thus an increase in inlet pressure is transmitted directly to the outlet when the valve is open and via the stepped plunger when the valve is closed so that the increase in outlet pressure is less than the increase in inlet pressure when the valve is closed.

2 Claims, 1 Drawing Figure

PATENTED NOV 19 1974 3,848,935
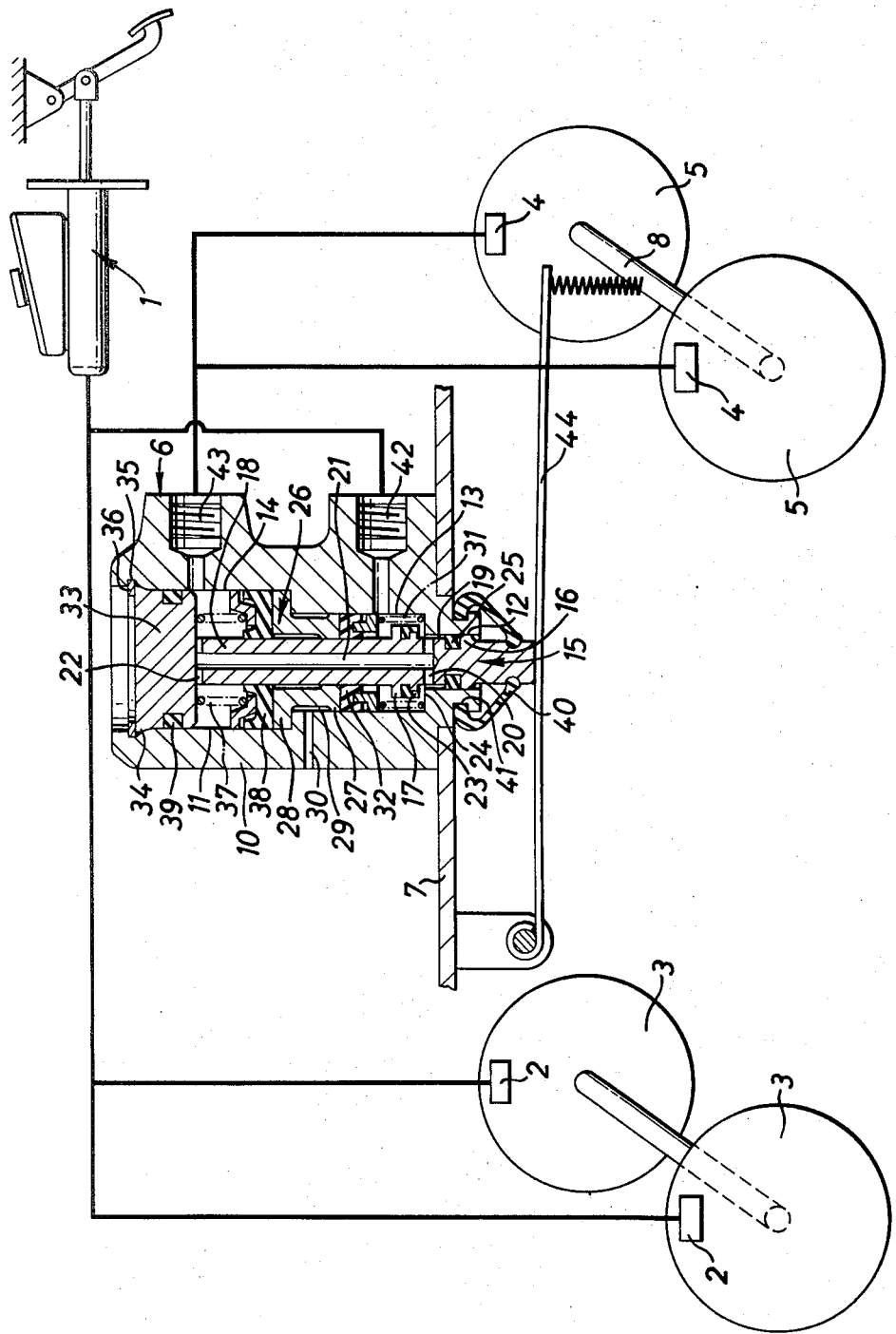

FLUID PRESSURE BRAKING SYSTEMS FOR VEHICLES

This invention is concerned with fluid pressure braking systems for vehicles. The fluid pressure braking systems are of the kind which are operable so that fluid pressure supplied to a motor cylinder or cylinders to apply brakes to one wheel or group of wheels of a vehicle, usually the front wheels, is completely under the control of the driver, and, due to the inclusion of a pressure control valve which controls the fluid pressure supplied to a motor cylinder or cylinders to apply the brakes to another wheel or group of wheels of the vehicle, usually the rear wheels, the fluid pressure supplied to the motor cylinder or cylinders to apply the brakes to said other wheel or group of wheels is only under the complete control of the driver if the fluid pressure does not exceed a pressure determined by the pressure control valve, the pressure control valve being operable in accordance with the load supported by said other wheel or group of wheels so that the pressure determined by said pressure control valve at which the pressure supplied to the motor cylinder or cylinders to apply the brakes to said other wheel or group of wheels ceases to be completely under the control of the driver, varies with variations in the load supported by said other wheel or group of wheels.

It is an object of this invention to provide an improved pressure control valve for use in a fluid pressure braking system of the kind referred to.

According to this invention there is provided a fluid pressure control valve for controlling fluid pressure acting in a motor cylinder to apply a brake to a wheel of a vehicle, comprising a valve body having an inlet adapted to be connected to a fluid pressure source and an outlet for connection to the motor cylinder, valve means in the valve body to control communication between said inlet and said outlet, the valve means comprising a valve seat defined by the valve body, one plunger which co-operates with said valve seat to close said valve means, resilient means acting on said one plunger to urge said one plunger out of engagement with said valve seat and open said valve means, and another plunger exposed on one side to the pressure at said inlet and on the other side to the pressure at said outlet, wherein said other plunger is stepped, the smaller diameter portion of said other plunger being exposed to the pressure at said inlet and the larger diameter portion of said other plunger being exposed to the pressure at said outlet, the arrangement being such that fluid pressure at said inlet acts upon said one plunger in opposition to the action of said resilient means, said valve means being open when the loading on said one plunger due to said resilient means exceeds the loading applied to the plunger by fluid pressure at the inlet so that fluid pressure at the inlet is transmitted through said valve means to the outlet, and said valve means is closed when the loading applied to said one plunger by fluid pressure at the inlet exceeds the loading applied to said one plunger by said resilient means so that an increase in pressure at said inlet is transmitted to said outlet by said other plunger, without the valve means being reopened, the increase in pressure at said outlet being less, when said valve means is closed, than the increase in pressure at said inlet by an amount determined by the ratio between the cross-sectional areas of the sides of said other piston which are exposed to fluid pressure at the inlet and outlet respectively.

Preferably said valve seat is annular, a portion of said one plunger extending therethrough so that an annular space is defined between the inner periphery of the annular valve seat and said plunger portion, said inlet communicating with said outlet via said annular space. Conveniently said one plunger has an annular flange which engages with said annular valve seat to close said valve means.

The valve body may comprise two coaxial bores which open into opposite sides of an enlarged chamber, one of the bores being closed at its end remote from the enlarged chamber, the annular valve seat surrounding the end of the other coaxial bore which opens into the enlarged chamber, the other end of said other coaxial bore being open, said other plunger having two axially spaced portions spaced apart by a portion of reduced diameter, each said axially spaced portion being engaged slidably in a respective one of the two coaxial bores, the inlet opening into said enlarged chamber and being in communication with the bore portion of said one coaxial bore between the closed end thereof and the nearer end of said one plunger and the outlet opening into the annular spaced defined within said other coaxial bore around the reduced diameter portion of said one plunger so that the inlet communicates with the outlet via said annular space when said valve means are open.

One embodiment of this invention will be described now by way of example only with reference to the accompanying drawing which is a diagrammatic representation of a liquid pressure braking system for a vehicle which includes a pressure reducing valve controlling rear brake pressure, the pressure reducing valve being shown in transverse section.

Referring to the drawing, a liquid pressure braking system for a vehicle comprises a master cylinder 1 which is connected directly to brake operating motor cylinders 2 on the front wheels 3 of the vehicle, and which is connected to brake operating motor cylinders 4 on the rear wheel 5 of the vehicle via a pressure reducing valve 6 which is fixed to the vehicle body 7. The pressure reducing valve 6 comprises a valve body 10 having a through bore 11 which is stepped. The stepped through bore 11 comprises a first bore portion 12 at one end, a second bore portion 13 having a diameter greater than that of the first bore portion 12, and a third bore portion 14 having a diameter greater than that of the second bore portion 13, extending between the second bore portion 13 and the other end of the bore 11.

A plunger 15 has a first end portion 16 which extends through and is slidable in the first bore portion 12, a second portion 17 having a diameter which is larger than that of the first plunger end portion 16 and slightly smaller than that of the second bore portion 13, and, on the side of said second plunger portion 17 remote from the first plunger end portion 16, a third portion 18 of smaller diameter than the first plunger end portion 16. The second plunger portion 17 is located within the second bore portion 13 and the third plunger portion 18 extends into the third bore portion 14. The first plunger end portion 16 is reduced in diameter adjacent the second plunger portion 17, as shown at 19. A diametral passage 20 in the plunger 15 opens into the reduced diamter plunger portion 19. An axial passage 21 in the plunger 15 communicates at one end with the diametral passage 20 and extends axially to open at the end of the plunger 15 remote from the first plunger end portion 16. Radial grooves 22 formed in the end of the plunger 15 remote from the first plunger end portion 16 open into the axial passage 21 and extend radially through the tubular wall of the third plunger portion 18.

A sealing ring 23 carried by the second plunger portion 17 is adapted to seat on a shoulder 24 defined between the first and second bore portions 12 and 13. A packing ring 25 on the first plunger end portion 16 seals against flow of liquid through the first bore portion 12.

A stepped annular piston 26 is slidable on the third plunger portion 18, a smaller diameter portion 27 of the stepped piston 26 being engaged slidably in the second bore portion 13 and a larger diameter portion 28 of the piston 26 being engaged slidably in the third bore portion 14. An annular recess 29 in the outer surface of the smaller diameter piston portion 27 is permanently in communication with atmosphere via a passage 30 in the body 10. A light spring 31 takes its reaction from the shoulder between the first and second bore portions 12 and 13 and urges an annular packing ring 32 into abutment with the smaller diameter end of the stepped piston 26.

A plug 33, having an outwardly flared portion 34 at one end, is located axially within the third bore portion 14 adjacent the open end thereof by engagement of the outwardly flared portion 34 in an annular recess 35 defined in the wall of the third bore portion 14 and by the action of a circlip 36 engaged in the recess 35. A light spring 37 takes its reaction from the plug 33 and urges an annular packing ring 38 into abutment with the larger diameter portion of the piston 26. The plug 33 carries an annular sealing ring 39 which seals against liquid flow between the plug 33 and the wall of the third bore portion 14.

An annular sealing boot 40 of flexible material has its radially inner periphery engaged in an annular groove formed in the end of the first plunger end portion 16 which projects outwardly from the valve body 10, and has its radially outer periphery engaged in an annular groove 41 formed in the outer surface of the valve body 10.

An inlet port 42 formed in the valve body 10 is in communication with the liquid pressure outlet of the master cylinder 1 and communicates with the annular chamber defined around the plunger 15 within the second bore portion 13 between the shoulder 24 and the packing ring 32. An outlet port 43, formed in the valve body 10, opens into the third bore portion 14 between the plug 33 and the larger diameter packing ring 38, and is in communication with the brake operating motor cylinders 4.

The plunger 15 is urged into a position in which its end remote from the first plunger end portion 16 abuts the plug 33, by the action of resilient means arranged to exert a load which varies with the load supported by the rear wheels of the vehicle. The resilient means include a blade spring 44 which is deflected by movement of the vehicle body relative to an axle or like support for the rear wheels of the vehicle.

The term "vehicle body" is intended to include the whole structure supported by the spring means of the vehicle whether it comprises an integral structure or a separate chassis and body. The blade spring 44 is attached pivotally at one end to the body 7 of the vehicle at a point adjacent the valve 6 and has its other end connected to the rear axle 8 of the vehicle in such a way that the blade spring 44 is deflected by movement of the body 7 relative to the wheels 3, 5, and exerts an increasing load on the plunger 15 of the valve 6 as the axle 8 approaches the body 7 of the vehicle due to increase of the vehicle load supported by the wheels 3 and 5.

It will be appreciated that the inlet port 42 is in communication with the outlet port 43 via the diametral passage 20, the axial passage 21 and the radial passage 22 when the plunger 15 is held in abutment with the plug 33 by the action of the resilient means. It will be understood also that the stepped piston 26 is subjected to the same liquid pressure on both sides. Thus the stepped piston 26 is held by the differential liquid pressure loading thereon with its larger diameter portion 28 in engagement with the annular shoulder defined between the second and third bore portions 13 and 14.

Liquid pressure at the outlet port 43, which is the pressure in the rear brake operating motor cylinders 4, acts upon the end of the plunger 15 remote from the first plunger end portion 16 to oppose the load exerted on the plunger 15 by the resilient means. When the liquid pressure at the outlet port 43 is sufficient to overcome the load exerted on the plunger 15 by the resilient means, the plunger 15 moves away from the plug 33 to engage the sealing ring 23 with the co-operating valve seat defined by the annular shoulder 24 and thus close the conduit interconnection between the inlet port 42 and the outlet port 43. Thus no further liquid under pressure can be passed through the valve 6 to the motor cylinders 4 operating the brakes on the rear wheels 5. However, the liquid pressure at the inlet port 42 acts on the smaller diameter portion 27 of the stepped piston 26 and, if the liquid pressure at the inlet portion 42 increases to the extent that the liquid pressure loading on the stepped piston due to liquid pressure at the inlet port 42 exceeds the liquid pressure loading on the stepped piston 26 due to the liquid pressure at the outlet port 43, the stepped piston 26 is moved towards the plug 33 and liquid is displaced from the third bore portion 14 through the outlet port 43 to the motor cylinders 4 which operate brakes on the rear wheels 5. Thus, if the pressure generated by the master cylinder is further increased the motor cylinders 2 on the front wheels 3 which are connected directly to the master cylinder 1, operate to apply the front brakes with an increased force directly proportional to the pressure increase, but the increase of application of the brakes on the rear wheels takes place at a lesser rate, the ratio between the increase of the pressure in the motor cylinders 4 actuating the brakes on the rear wheels 5 and the increase in the pressure generated in the master cylinder 1 being proportional to the ratio between the cross-sectional areas of the two portions 27 and 28 of the stepped piston 26.

The action of the resilient means on the plunger 15 results in the braking pressure at which the passage through the plunger 15 is closed and limitation of the effort to apply the rear brakes commences, depending on the load carried by the rear wheels 5.

Various modifications or refinements of the braking system described above may be incorporated. For example, the master cylinder may be replaced by any other suitable fluid pressure source, such as a driver operable control valve of a full flow liquid pressure braking system.

I claim:

1. A fluid pressure control valve for controlling fluid pressure acting in a motor cylinder to apply a brake to a vehicle wheel, comprising valve means in a valve body with an inlet adjacent one end for communication with a fluid pressure source, said body having an outlet spaced from said inlet adjacent another end for communication with a motor cylinder of a vehicle wheel, a first plunger disposed in said body extending through an opening in said one end and having an enlarged annular flange on one end thereof in communication with said inlet, the inner end of said valve body adjacent said opening forming a valve seat therein for said annular flange to seat thereon to close off communication between said inlet and outlet, resilient means acting on the portion of the plunger extending out of said valve body opening and normally urging said annular flange out of contact with said valve seat for maintaining said flange unseated and said inlet and outlet in communication with each other, when the brake is not being applied, a second plunger disposed in said valve body comprising an annular flange slidably disposed on said first plunger, said second plunger flange being stepped and having one face in communication with said outlet and another face in communication with said inlet, said one face having a diameter and cross sectional area substantially greater than its other face, whereby said valve means is closed and said one plunger is seated when the loading applied to said one plunger by fluid pressure at the inlet exceeds the loading applied to said one plunger by said resilient means, so that an increase in pressure at said inlet is transmitted to said outlet by said second plunger without the valve means being reopened, the increase in pressure at said outlet being less, when said valve means is closed, than the increase in pressure at said inlet by an amount determined by the ratio between the cross-sectional areas of the sides of said second plunger which are exposed to fluid pressure at the inlet and outlet respectively.

2. A fluid pressure control valve as claimed in claim 1, wherein said valve seat is annular, and a portion of the one plunger extends therethrough so that an annular space is defined between the inner periphery of the annular valve seat and said one plunger, said inlet communicating with said outlet via said annular space.

* * * * *